UNITED STATES PATENT OFFICE.

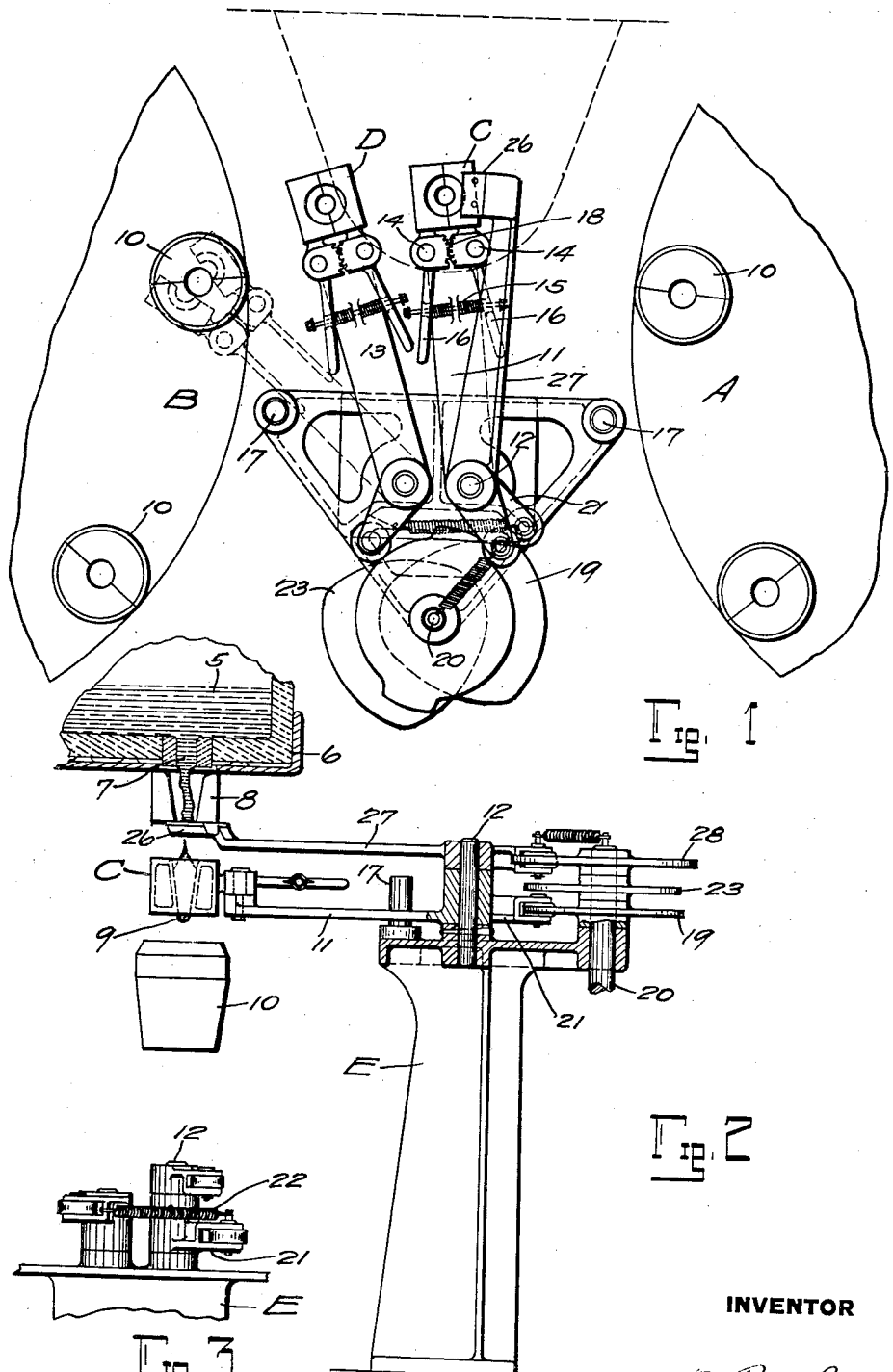

JOHN F. RULE, OF TOLEDO, OHIO, ASSIGNOR TO OWENS BOTTLE MACHINE COMPANY, OF TOLEDO, OHIO, A CORPORATION OF OHIO.

MEANS FOR CHARGING GLASS-MOLDS.

1,331,528.   Specification of Letters Patent.   Patented Feb. 24, 1920.

Application filed July 26, 1918. Serial No. 246,797.

*To all whom it may concern:*

Be it known that I, JOHN F. RULE, a citizen of the United States, residing at Toledo, in the county of Lucas and State of Ohio, have invented new and useful Improvements in Means for Charging Glass-Molds, of which the following is a specification.

My invention relates to apparatus for flowing molten glass, separating therefrom individual portions or charges, forming said charges into gobs and transferring the gobs to receptacles or molds on a glass forming machine.

An object of the invention is to provide a simple and practical mechanism comprising a receptacle in which the flowing glass is accumulated and formed into gobs, which receptacle is movable from a receiving position to a discharging position and thereby serves as a transfer device or carrier for transferring the gobs to the molds.

A further object of the invention is to provide an improved mechanism for transferring charges of glass alternately to a plurality of mold positions, whereby a number of glass forming machines may be supplied from a single glass flowing apparatus.

Other objects and advantages will appear hereinafter.

In the accompanying drawings: Figure 1 is a plan view partly diagrammatic of a construction embodying the principles of my invention.

Fig. 2 is a sectional elevation of such apparatus.

Fig. 3 is a detail of the cam operated levers.

The molten glass 5 is supplied from a boot or extension 6 of a continuous melting furnace. A continuous stream of glass flows through an opening 7 in the bottom of the boot and through a passageway or compartment 8 directly beneath said opening into the transfer cups C and D in which the glass accumulates to form gobs or charges 9. The cups C and D serve as transfer devices for carrying the gobs and delivering them to molds 10 on the mold tables A and B. The transfer cup C is carried on an arm 11 mounted to rock on a shaft 12 and thereby swing the cup from its receiving position directly beneath the flow opening to a position over and in register with a mold 10 on the mold table A. The transfer cup D is likewise carried on an arm 13 to swing from a receiving position beneath the flow opening to the discharge position shown in broken lines in Fig. 1, in which position the cup is over a mold 10 on the table B. Each of the transfer cups is made in sections mounted to swing on pivots 14, permitting the sections to separate and thereby drop the gob of glass into the mold. A compression spring 15 between arms 16 extending from the cup sections, serves to hold said sections normally together. As the cup swings to discharging position over a mold, a stop 17 in the path of an arm 16 separates the cup sections. The stops 17 may be mounted on the mold tables, or on the standard E which supports the transfer cups. Intermeshing gears 18 insure equal movement of the cup sections about their pivots 14.

The cup carrying arm 11 is rocked by means of a cam 19 on a continuously rotating shaft 20, said cam arranged to engage a rock arm 21 which forms an extension of the arm 11 on the shaft 12. A spring 22 holds the arm 21 in engagement with its cam. The cam is so shaped and the parts so proportioned that during nearly one half revolution of the cam shaft the cup C is held stationary beneath the flow opening 7 for receiving the glass which flows directly therein. The cam then operates to swing the cup to a position directly over the mold 10, in which position it is held open by the stop 17 until the gob has dropped into the mold. When the revolution of the cam shaft is nearly completed the cam operates to return the cup to receiving position beneath the flow opening.

The movements of the cup D are controlled by a cam 23 on the shaft 20, which cam operates in the same manner as the cam 19. The cams are so arranged that the cup D is close to the cup C when the latter commences its movement away from the flow, and immediately replaces the cup C. In like manner the cup C is close to and immediately replaces the cup D when the latter moves with its charge away from the flow. The cams may be shaped to hold each cup at rest for a greater or less period of time in its position adjacent to the charging position.

A knife 26 forms a temporary bottom for the receptacle or channel 8 while a transfer cup is being moved from its receiving position and replaced by the other cup. A closed chamber is thus provided to retain the glass during the brief interval required for shifting the cups. This knife is carried by a rock arm 27 actuated by a cam 28 on the shaft 20. When the charge of glass has accumulated in the gathering cup C the knife swings across the bottom of the chamber 8 to sever the gob and support the oncoming stream until the transfer cup D is brought to position beneath the flow opening when the knife is withdrawn, permitting the glass to flow directly into the cup D. In like manner the knife operates to sever the charge in the cup D and supports the glass until the cup C is returned to charging position. It will be understood that the flow at the orifice 7 is continuous and not interrupted by the knife 26.

The cams 19 and 23 are so formed that the movement of one transfer cup away from the charging position and the movement of the other cup into position requires a very short interval of time, and as the knife 26 is timed to support the glass only during said transfer of the cups, the glass is supported on the knife for a very short time only. There is consequently but little cooling of the glass by contact with the knife. Any chilling effect due to such contact is substantially counteracted or eliminated in the transfer cup which, as shown, is open at its lower end. The inner walls of the cup are upwardly and outwardly inclined or flared so that the glass as it accumulates therein is prevented from dropping through the opening in the bottom of the cup. The lower end of the gob is, therefore, reheated from the interior of the accumulating mass of glass, thus overcoming any chilling effect due to the knife. As the glass accumulates in the cup it may gradually protrude below the bottom surface of the cup, owing to the interior flow or movement of the glass relative to the glass in contact with the walls of the cup. The outer chilled surface of the glass is thus spread out and attenuated, which further reduces the chilling effect, and the shape of the gob is, moreover, improved and is thus in the best condition for entering the mold. The transfer cup serves to give suitable shape to the gob. The cup with its charge of glass is brought to discharging position before the downward movement of the glass through the bottom of the cup has continued far enough to cause the glass or any portion thereof to drop from the cup.

The mold tables A and B may be rotated in synchronism with the movements of the transfer cups. Each mold table is given a step by step rotation, whereby the molds 10 thereon are successively brought into charging position directly beneath and in register with the discharging position of the transfer cup. The transfer cups may be made with hollow walls, as shown, for the circulation of water therein, or any other suitable provision may be made for cooling them. Ordinarily, however, such cooling is not necessary. Provision may also be made if found desirable for cooling the knives in any well known or improved manner.

Variations may be resorted to within the spirit and scope of my invention.

What I claim is:

1. The combination with means for flowing glass, of transfer receptacles movable alternately into position to receive a charge of glass, and means to move each receptacle to discharging position, discharge it and return it to a position adjacent the receiving position while the other is receiving its charge.

2. The combination with means for flowing molten glass, of a plurality of transfer receptacles arranged to be brought alternately into receiving position beneath the flow, and means to shift each mold laterally toward and from a discharging position while the other mold is receiving its charge.

3. The combination with mold tables, of a set of molds on each table arranged to be brought serially to a charging position, there being a different charging position for each set of molds, means to flow molten glass, transfer receptacles, and means to bring said receptacles alternately into position to receive glass from said flow and to shift said receptacles respectively to said charging positions.

4. The combination with molds, of means to flow molten glass, transfer receptacles, means to shift said receptacles alternately into position to receive glass from said flow, and means to discharge each receptacle into a mold while the other receptacle is in said receiving position, said receptacles having different discharging positions.

5. The combination with a receptacle to contain molten glass and provided with a discharge opening, of sets of molds located at opposite sides of the opening, transfer cups operable respectively to transfer glass to the respective sets of molds, and timed mechanism to move each cup to discharging position and discharge the glass therein into a mold while the other cup is in receiving position.

6. The combination with means for flowing molten glass, of transfer cups, arms on which said cups are mounted, and mechanism to swing each arm laterally independently of the other arm to move its cup from receiving position beneath the flow to a discharging position, said mechanism being timed to hold each cup in receiving position while the other is swinging and being discharged.

7. The combination with a receptacle to contain molten glass and provided with a flow opening, of transfer cups, means to shift said cups alternately to a position to receive the flow of glass, a knife, and mechanism to actuate said knife in timed relation to the shifting of the cups to sever the stream and support the oncoming glass while one cup is moved away from and the other cup moved into receiving position.

8. The combination with means for supplying a continuous stream of molten glass, of transfer receptacles shiftable alternately into position to receive the flow, and a knife operable to sever the stream and support the glass while the receptacles are being shifted.

9. The combination with means for supplying a continuous stream of molten glass, of transfer receptacles shiftable alternately into position to receive the flow, a knife operable to sever the stream and support the glass while the receptacles are being shifted, and means forming with the knife a closed chamber surrounding the stream of glass above the knife.

10. The combination with means for flowing a stream of glass, of receptacles arranged to be brought alternately into position to receive the glass, and timed mechanism to move each receptacle to a discharging position, cause it to discharge the glass and return it to an intermediate position adjacent the charging position while the other receptacle is receiving its charge.

11. The combination with means for flowing a stream of glass, of glass forming machines comprising molds, transfer cups, means to shift each cup from a receiving position beneath the flow laterally to a discharging position over a mold and then to an intermediate position adjacent the receiving position while the other cup is receiving its charge.

12. The combination of a container for molten glass provided with a discharge opening, sets of molds located at opposite sides of the opening, transfer cups operable respectively to transfer glass to the respective sets of molds, and timed mechanism to move each cup to a discharging position and discharge the glass therein into a mold and return it to a position adjacent the other cup while the latter is in position to receive its charge.

13. The combination with means for flowing molten glass, of a plurality of transfer receptacles arranged to be brought alternately into receiving position beneath the flow, and means to shift each receptacle laterally to and from a discharging position while the other receptacle is receiving its charge, there being a different discharging position for each of said receptacles.

14. The combination with means for producing a flow of molten glass, of transfer receptacles arranged to be brought alternately into position to receive a charge of glass from said flow, and means to swing each receptacle laterally from the receiving position to a discharging position, the discharging positions being at opposite sides of the flow.

15. The combination with means for supplying charges of molten glass, transfer receptacles, means to move each receptacle to a position to receive a charge of glass and to shift it laterally from said receiving position to a discharging position, the discharging position for the respective receptacles being at opposite sides of the receiving position, and mechanism for effecting said movements of the receptacle, said mechanism timed and arranged to move each receptacle to and from its discharging position while the other receptacle is in receiving position.

16. The combination with means for flowing a stream of molten glass, of mold tables at opposite sides of said stream, a series of molds on each table arranged to be brought successively to a charging position, transfer receptacles, and means to swing each receptacle from a charging position beneath the flow of glass laterally to a position to discharge into a mold and back to an intermediate position of rest, each receptacle arranged to move to its discharging position and return to said position of rest while the other receptacle is receiving its charge.

Signed at Toledo, in the county of Lucas and State of Ohio, this 22d day of July, 1918.

JOHN F. RULE.